United States Patent
Watanabe

(10) Patent No.: US 10,914,958 B2
(45) Date of Patent: Feb. 9, 2021

(54) VEHICLE DISPLAY DEVICE

(71) Applicant: Yazaki Corporation, Tokyo (JP)

(72) Inventor: Fumiya Watanabe, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 128 days.

(21) Appl. No.: 15/791,337

(22) Filed: Oct. 23, 2017

(65) Prior Publication Data

US 2018/0120572 A1    May 3, 2018

(30) Foreign Application Priority Data

Nov. 1, 2016    (JP) .................................. 2016-214632

(51) Int. Cl.
*G06F 3/01* (2006.01)
*G02B 27/01* (2006.01)
(Continued)

(52) U.S. Cl.
CPC .......... *G02B 27/0179* (2013.01); *B60K 35/00* (2013.01); *G06F 3/013* (2013.01); *G06K 9/0061* (2013.01); *G06K 9/00671* (2013.01); *G06K 9/00791* (2013.01); *G06K 9/00845* (2013.01); *B60K 2370/149* (2019.05);
(Continued)

(58) Field of Classification Search
CPC ...... B06R 2300/308; G02B 2027/0138; G02B 2027/0181; G02B 2027/0183; G02B 2027/0187; G02B 27/0179; G06F 3/013; G06K 9/0061; G06K 9/00671; G06K 9/00791; G06K 9/00845
See application file for complete search history.

(56) References Cited

U.S. PATENT DOCUMENTS

| | | | |
|---|---|---|---|
| 5,734,357 A | 3/1998 | Matsumoto | |
| 7,015,876 B1 * | 3/2006 | Miller | G09G 5/02 345/7 |

(Continued)

FOREIGN PATENT DOCUMENTS

| | | |
|---|---|---|
| EP | 3 054 371 A1 | 8/2016 |
| JP | 8-156646 A | 6/1996 |

(Continued)

OTHER PUBLICATIONS

Japanese Office Action for the related Japanese Patent Application No. 2016-214632 dated Oct. 30, 2018.

*Primary Examiner* — Ram A Mistry
(74) *Attorney, Agent, or Firm* — Kenealy Vaidya LLP

(57) ABSTRACT

A vehicle display device includes an HUD device that projects a display image onto a front windshield arranged in front of a driver's seat of a vehicle, and overlaps the display image with scenery in front of the vehicle to display the display image as a virtual image, and a front photographing camera that is installed in the vehicle and photographs at least the scenery in front of the vehicle. The HUD device adjusts contrast of the display image with respect to the scenery in front of the vehicle based on an image of an extracted image region including a portion overlapping with at least part of the display image when viewed from an eye point in a scenery photographing image photographed by the front photographing camera, the eye point corresponding to a position of an eye of a driver on the driver's seat.

11 Claims, 16 Drawing Sheets

(51) Int. Cl.
  *G06K 9/00* (2006.01)
  *B60K 35/00* (2006.01)
(52) U.S. Cl.
  CPC ............ *B60K 2370/1529* (2019.05); *B60K 2370/177* (2019.05); *B60K 2370/334* (2019.05); *B60R 2300/308* (2013.01); *G02B 2027/0138* (2013.01); *G02B 2027/0181* (2013.01); *G02B 2027/0183* (2013.01); *G02B 2027/0187* (2013.01)

(56) References Cited

U.S. PATENT DOCUMENTS

| | | | | |
|---|---|---|---|---|
| 8,427,395 | B2* | 4/2013 | Seder | G01S 13/723 345/7 |
| 2016/0170487 | A1* | 6/2016 | Saisho | G01C 21/3635 345/156 |

FOREIGN PATENT DOCUMENTS

| | | |
|---|---|---|
| JP | 2007-050757 A | 3/2007 |
| JP | 2009-163084 A | 7/2009 |
| JP | 2016-101771 A | 6/2016 |
| JP | 6447360 | * 12/2016 |

\* cited by examiner

VEHICLE DISPLAY DEVICE

CROSS-REFERENCE TO RELATED APPLICATION(S)

The present application claims priority to and incorporates by reference the entire contents of Japanese Patent Application No. 2016-214632 filed in Japan on Nov. 1, 2016.

BACKGROUND OF THE INVENTION

1. Field of the Invention

The present invention relates to a vehicle display device.

2. Description of the Related Art

There is conventionally known a head up display (HUD) device that displays information about driving such as a vehicle speed. The HUD device projects a display image on a reflection member arranged in front of a driver's seat of a vehicle, and displays the display image as a virtual image by overlapping the display image with scenery in front of the vehicle, which can be viewed through the reflection member from the driver's seat (for example, Japanese Patent Application Laid-open No. 2009-163084).

However, there is still room for improvement in the HUD device to improve visibility of the display image by a driver.

SUMMARY OF THE INVENTION

The present invention is made in view of such a situation, and an object of the present invention is to provide a vehicle display device capable of improving visibility of a display image by a driver.

In order to achieve the above mentioned object, a vehicle display device according to one aspect of the present invention includes a display unit that projects a display image onto a reflection member arranged in front of a driver's seat of a vehicle, and overlaps the display image with scenery in front of the vehicle to display the display image as a virtual image, and a photographing unit that is installed in the vehicle and photographs at least the scenery in front of the vehicle, wherein the display unit adjusts contrast of the display image to the scenery in front of the vehicle based on an image of an extracted image region including a portion overlapping with the display image when viewed from an eye point in a photographing image photographed by the photographing unit, the eye point corresponding to a position of an eye of a driver on the driver's seat.

According to another aspect of the present invention, in the vehicle display device, the photographing unit may photograph the scenery in front of the vehicle from an outside of an eye box as a region in which the display image can be visually recognized.

The vehicle display device according to still another aspect of the present invention further may include a detector that detects the eye point, wherein the extracted image region is a region that is determined based on the eye point detected by the detector.

According to still another aspect of the present invention, in the vehicle display device, the display unit further may include a projector that projects the display image, and a mirror that reflects the display image projected by the projector to the reflection member, and the extracted image region is a region that is determined based on a reflection angle of the mirror.

According to still another aspect of the present invention, in the vehicle display device, when the display image includes a display item having high priority, the extracted image region may be a region including a portion overlapping with the display item having high priority when viewed from the eye point in the photographing image.

According to still another aspect of the present invention, in the vehicle display device, the extracted image region may be a largest region that is possibly overlapped with the display image when viewed from the eye point in the photographing image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described hereinafter in detail with reference to the drawings. The present invention is not limited to the embodiments described below. Components described below include a component that is easily conceivable by those skilled in the art and components that are substantially the same. The components described below can be appropriately combined. The components can be various omitted, replaced, or modified without departing from the gist of the present invention.

First Embodiment

The following describes a vehicle display device 1 according to a first embodiment. The vehicle display device 1 overlaps a display image with scenery in front of a vehicle to display the display image as a virtual image, and photographs the scenery in front of the vehicle to adjust contrast of the display image to the scenery in front of the vehicle based on the photographed image. The following describes the vehicle display device 1 in detail.

In the following description, a direction along the entire length of a vehicle 100 is referred to as an entire length direction, and a direction along the height of the vehicle 100 is referred to as a vehicle height direction. The entire length direction and the vehicle height direction are orthogonal to each other.

Figure 1:
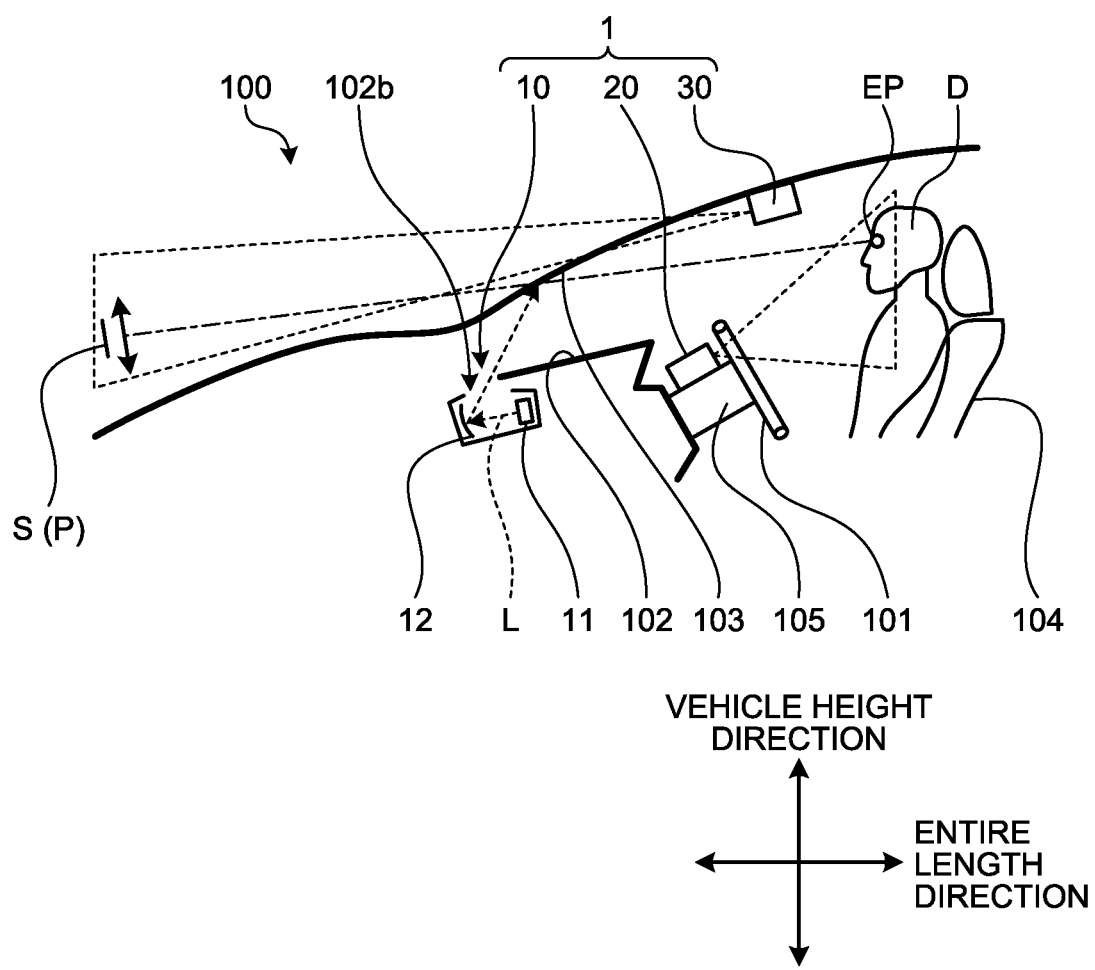
FIG. 1 is a schematic diagram illustrating a configuration example of a vehicle display device according to a first embodiment.
Figure 3:
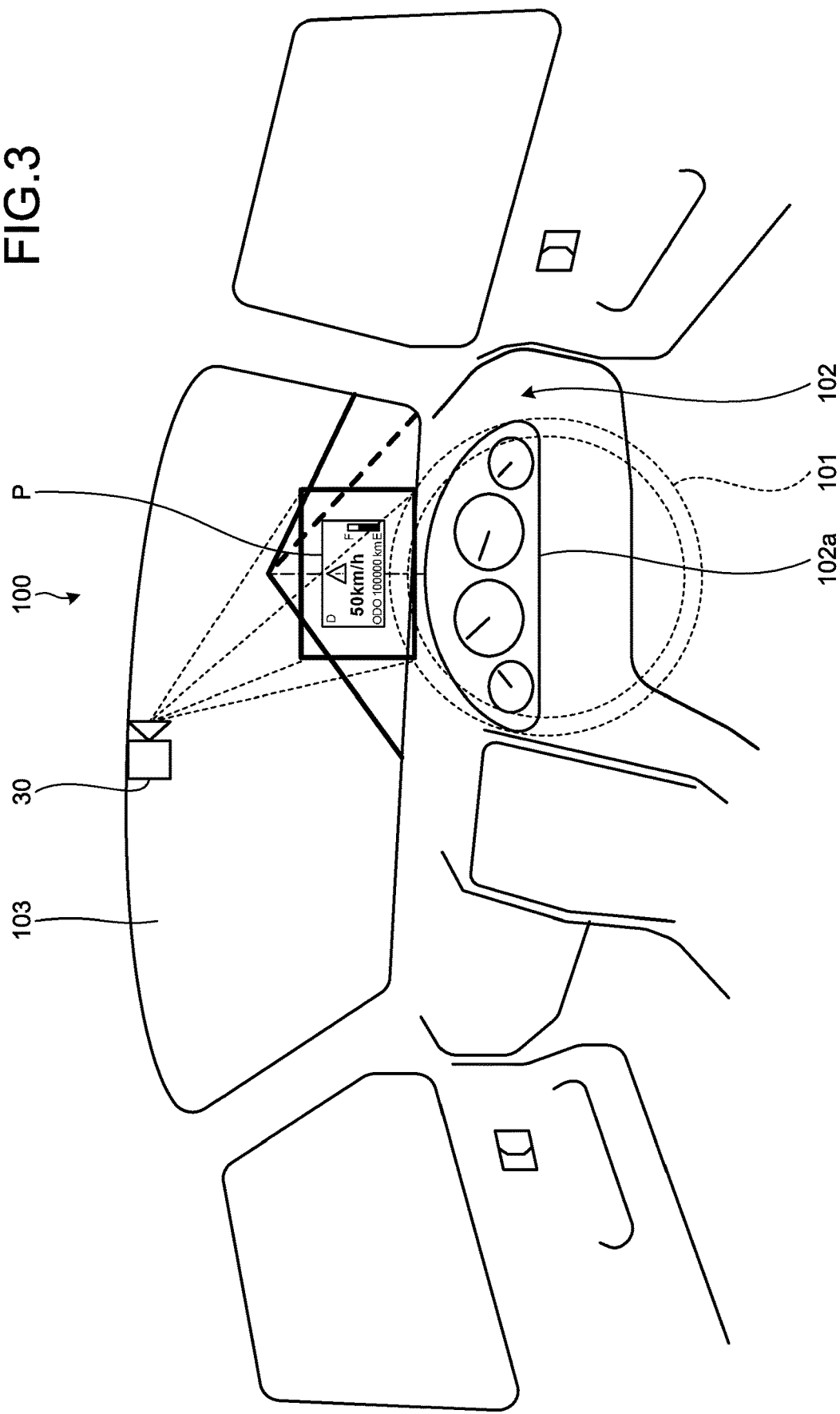
FIG. 3 is a schematic diagram illustrating a display example of the vehicle display device according to the first embodiment.

As illustrated in FIG. 1, the vehicle display device 1 is installed in the vehicle 100. In the vehicle 100, a steering wheel 101 is installed in front of a driver D, an instrument panel 102 is installed in front of the steering wheel 101, and a front windshield 103 is installed in front of the instrument panel 102. The instrument panel 102 is a member that partitions a front compartment space of the vehicle 100, and a meter 102a such as a speed meter is installed therein (refer to FIG. 3). The instrument panel 102 has an opening 102b that transmits display light L projected from an HUD device 10 described later. The front windshield 103 is a reflection member, and forms a boundary between an inside of the vehicle 100 and an outside of the vehicle 100, and transmits front scenery in the entire length direction of the vehicle 100.

The vehicle display device 1 includes the head up display (HUD) device 10 as mentioned above serving as a display unit, an interior photographing camera 20 serving as a detector, and a front photographing camera 30 serving as a photographing unit. The HUD device 10 is arranged in the instrument panel 102 to display a display image P as a virtual image. The HUD device 10 projects the display light L including the display image P onto the front windshield 103, overlaps the display image P with scenery in front of the vehicle 100 in which the scenery can be viewed through the front windshield 103 from an eye point EP as a position of an eye of the driver D on a driver's seat 104, and displays the display image P as a virtual image S. In this case, the eye point EP is included in an eye range which is a position the eye of the driver D is positioned, and previously defined depending on the vehicle 100. Typically, the eye range is a region that is defined based on a statistical distribution of an eye position of the driver D in the vehicle 100, and corresponds to a region including a predetermined proportion (for example, 95%) of eye positions of the driver D in a state in which the driver D sits on the driver's seat 104, for example. The HUD device 10 projects the display light L including the display image P onto the front windshield 103, and forms an optical path so that the display light L reflected on the front windshield 103 goes toward the eye point EP of the driver D. The driver D visually recognizes the display image P as the virtual image S while visually recognizing the scenery in front of the vehicle 100 through the front windshield 103. The display image P is a rectangular image, and includes, for example, a plurality of display items related to the vehicle 100 such as a vehicle speed, a residual amount of fuel, total mileage, and a warning mark.

Figure 2:
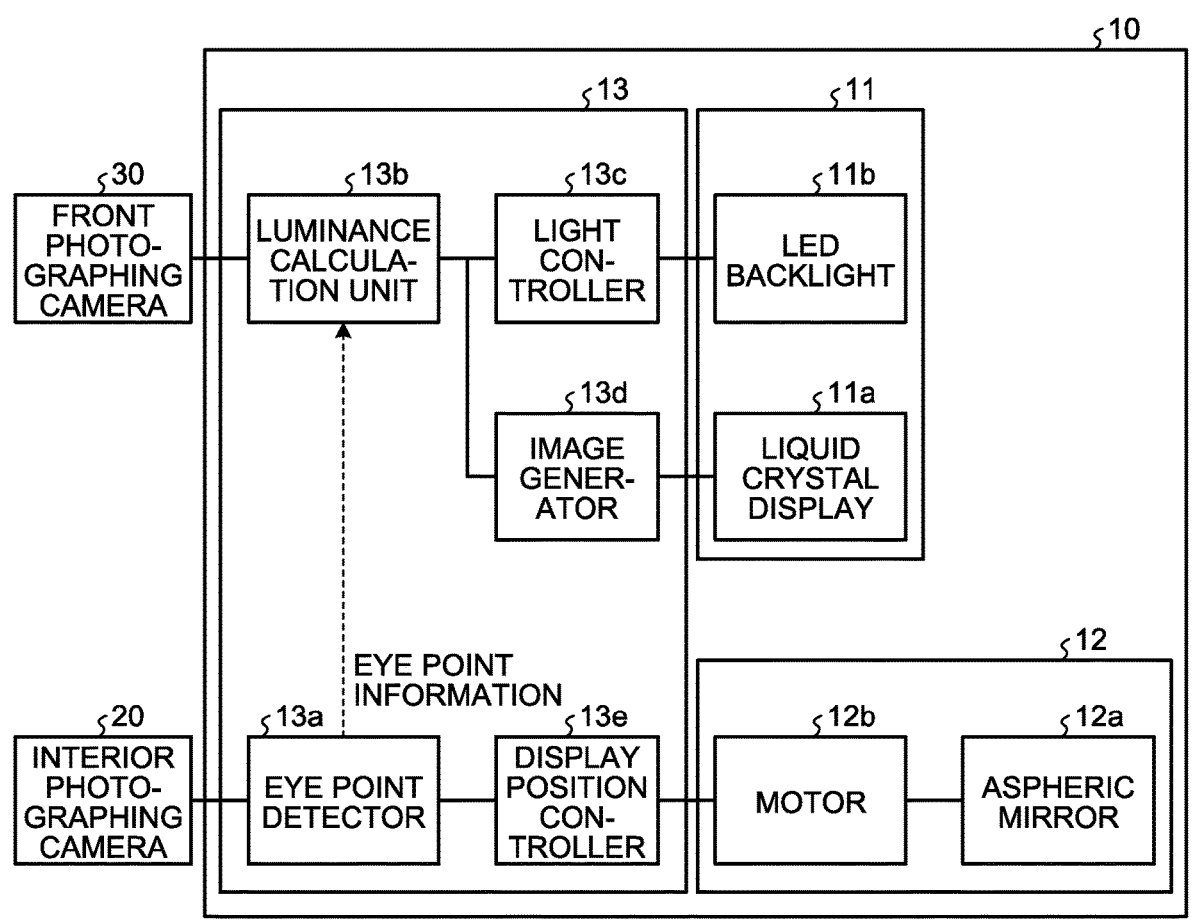
FIG. 2 is a block diagram illustrating a configuration example of the vehicle display device according to the first embodiment.

As illustrated in FIG. 2, the HUD device 10 includes a display device 11 serving as a projector, an aspheric mirror unit 12, and a controller 13. The display device 11 projects the display light L including the display image P onto the aspheric mirror unit 12. The display device 11 includes a liquid crystal display 11a that displays the display image P, and an LED backlight 11b arranged on a back surface of the liquid crystal display 11a. The liquid crystal display 11a includes a plurality of pixels, and performs display in an RGB color space in which the pixels are configured by three primary colors of red, green, and blue, for example. The liquid crystal display 11a may be configured by a monochromatic display. The LED backlight 11b may include a light emitting diode (LED) as a light source, and irradiates each pixel of the liquid crystal display 11a with light (white light). In the display device 11, the LED backlight 11b irradiates the liquid crystal display 11a with white light based on a display control signal from the controller 13 described later. The display light L including the display image P passing through the liquid crystal display 11a is projected onto the aspheric mirror unit 12.

The aspheric mirror unit 12 includes an aspheric mirror 12a serving as a mirror and a motor 12b. The aspheric mirror 12a has an optical characteristic that forms the virtual image S at a position of a predetermined distance. The aspheric mirror 12a is arranged to be opposed to the display device 11, and is supported so that inclination thereof in the vehicle height direction can be adjusted with respect to the front windshield 103. The motor 12b is a driving source that changes the inclination of the aspheric mirror 12a. The motor 12b is, for example, a stepping motor, and coupled to the aspheric mirror 12a via a coupling mechanism (not illustrated). The motor 12b is driven based on a driving signal from the controller 13, and changes the inclination of the aspheric mirror 12a with respect to the front windshield 103. For example, pulse power is supplied to the motor 12b as a driving signal, and the motor 12b is rotated at a predetermined step angle. The inclination of the aspheric mirror 12a with respect to the front windshield 103 is changed by the motor 12b, and the aspheric mirror 12a reflects the display light L projected from the display device 11 toward the front windshield 103 via the opening 102b of the instrument panel 102. The display light L reflected on the aspheric mirror 12a is reflected on the front windshield 103, and reaches the eye point EP of the driver D. Accordingly, the driver D can visually recognize the virtual image S in front of the front windshield 103 in the entire length direction of the vehicle 100.

The interior photographing camera 20 photographs an interior of the vehicle 100. The interior photographing camera 20 is installed in the interior of the vehicle 100. For example, the interior photographing camera 20 is installed at a position opposed to the driver D on the driver's seat 104. In the first embodiment, the interior photographing camera 20 is installed on an upper surface of a steering column 105 that couples the instrument panel 102 to the steering wheel 101. A camera lens of the interior photographing camera 20 is caused to face a face of the driver D on the driver's seat 104. The interior photographing camera 20 is connected to the controller 13, and outputs an interior photographing image PA to the controller 13, the interior photographing image PA being obtained by photographing the inside of the vehicle including the face of the driver D.

The front photographing camera 30 photographs the front of the vehicle 100 in the entire length direction. The front photographing camera 30 is installed in the vehicle 100. For example, the front photographing camera 30 is installed on an indoor side of a roof of the vehicle 100. The front photographing camera 30 may be installed on a back surface (opposite side of a mirror plane) of a rearview mirror (not illustrated) of the vehicle 100. Camera lens of the front photographing camera 30 are directed forward in the entire length direction of the vehicle 100. In the first embodiment, the front photographing camera 30 photographs scenery in front of the vehicle 100 from an outside of an eye box EB. The eye box EB is a space region including the eye point EP in which the driver D can visually recognize the display image P displayed as a virtual image overlapping with the scenery in front of the vehicle 100. By viewing the scenery in front of the vehicle 100 from an inside of the eye box EB, the driver D can visually recognize the display image P displayed as a virtual image overlapping with the scenery in front of the vehicle 100. On the other hand, the front photographing camera 30 photographs the scenery in front of the vehicle 100 from the outside of the eye box EB, so that the display image P displayed as a virtual image is not included in a scenery photographing image PB (photographing image) obtained by photographing the scenery in front of the vehicle 100. The front photographing camera 30 is connected to the controller 13, and outputs, to the controller 13, the scenery photographing image PB obtained by photographing the scenery in front of the vehicle 100 without including the display image P.

The controller 13 controls the display device 11 and the aspheric mirror unit 12. The controller 13 includes an electronic circuit mainly constituted of a known microcomputer including a Central Processing Unit (CPU), a Read Only Memory (ROM) and a Random Access Memory (RAM) constituting a storage unit, and an interface. The controller 13 is connected to the display device 11, and outputs a display control signal to the display device 11 to control projection of the display light L including the display image P. The controller 13 is connected to the aspheric mirror unit 12, and outputs a driving signal to the aspheric mirror unit 12 to adjust inclination of the aspheric mirror 12a with respect to the front windshield 103.

Specifically, the controller 13 includes an eye point detector 13a, a luminance calculation unit 13b, a light controller 13c, an image generator 13d, and a display position controller 13e. The eye point detector 13a detects the eye point EP that is a position of the eye of the driver D on the driver's seat 104. The eye point detector 13a is connected to the interior photographing camera 20, and detects the eye point EP from the interior photographing image PA photographed by the interior photographing camera 20. The eye point detector 13a detects the eye point EP of the driver D based on a position of an iris of an eyeball on a face image in the interior photographing image PA, for example. The eye point detector 13a outputs, to the luminance calculation unit 13b and the display position controller 13e, eye point information indicating the detected eye point EP of the driver D.

The display position controller 13e controls a display position of the display image P. The display position controller 13e is connected to the eye point detector 13a and the aspheric mirror unit 12, and controls the aspheric mirror unit 12 based on the eye point information indicating the eye point EP of the driver D output from the eye point detector 13a to control the display position of the display image P. For example, the display position controller 13e moves the aspheric mirror 12a when a moving amount of the position of the eye point EP is in a predetermined range or more, and does not move the aspheric mirror 12a when the moving amount of the position of the eye point EP is below the predetermined range.

Figure 4:
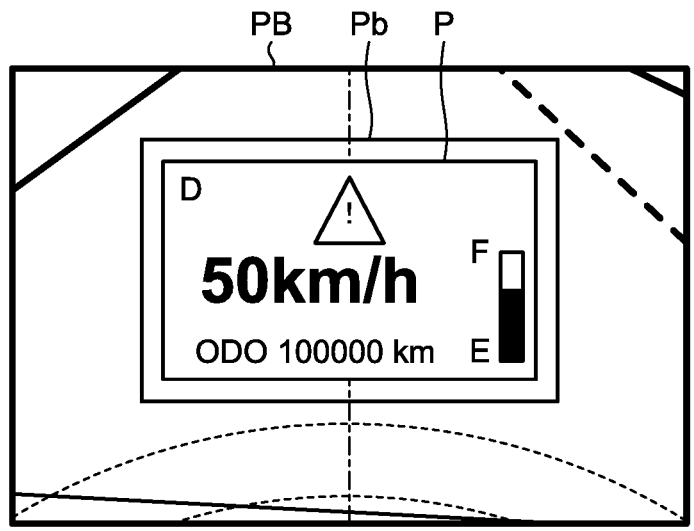
FIG. 4 is a diagram illustrating an example of a scenery photographing image taken by a front photographing camera according to the first embodiment.
Figure 5:
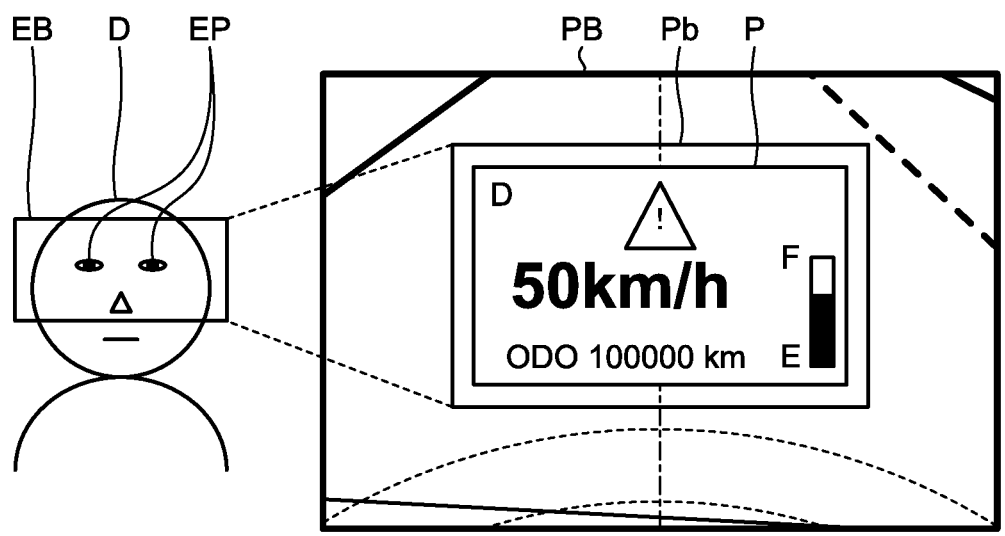
FIG. 5 is a diagram illustrating an example of an extracted image region according to the first embodiment.
Figure 6:
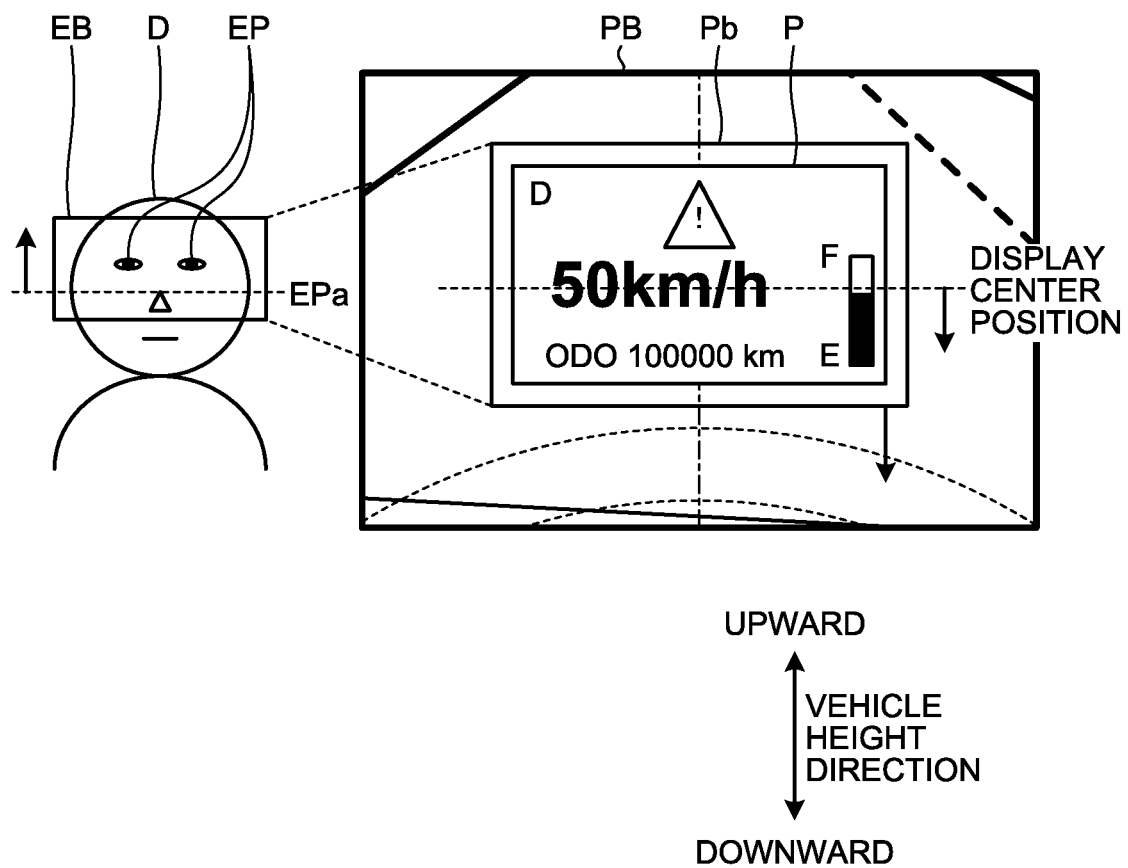
FIG. 6 is a diagram illustrating a movement example of the extracted image region according to the first embodiment.

The luminance calculation unit 13b calculates luminance of the image. The luminance calculation unit 13b is connected to the front photographing camera 30, and sets, as an extracted image region Pb, a region including a portion overlapping with the display image P (virtual image S) displayed as a virtual image when viewed from the eye point EP in the scenery photographing image PB photographed by the front photographing camera 30 (refer to FIG. 4). In the scenery photographing image PB illustrated in FIG. 4, the display image P is displayed for ease of understanding of explanation. However, the display image P is not displayed in the actual scenery photographing image PB because the scenery photographing image PB is an image photographed from the outside of the eye box EB. The same is applied to FIG. 5, FIG. 6, FIG. 10, FIG. 11, FIG. 12, FIG. 13, and FIG. 19 described later. The luminance calculation unit 13b sets the extracted image region Pb based on the eye point information indicating the eye point EP of the driver D output from the eye point detector 13a. For example, as illustrated in FIG. 5, the luminance calculation unit 13b specifies the eye box EB from the eye point EP, and sets, as the extracted image region Pb, a region corresponding to the space region of the eye box EB in the scenery photographing image PB. The luminance calculation unit 13b sets, as the extracted image region Pb, a certain region including a portion that is possibly overlapped with the display image P (virtual image S) when viewed from the eye point EP in the scenery photographing image PB. For example, the luminance calculation unit 13b sets the extracted image region Pb to be large as the eye box EB is large, and sets the extracted image region Pb to be small as the eye box EB is small. The luminance calculation unit 13b moves the extracted image region Pb including the virtual image S when viewed from the eye point EP in the vehicle height direction in accordance with movement of the eye point EP and the eye box EB in the vehicle height direction. For example, as illustrated in FIG. 6, when the eye point EP and the eye box EB are moved upward from a reference position EPa in the vehicle height direction, the virtual image S moves downward in the vehicle height direction, so that the luminance calculation unit 13b moves the extracted image region Pb downward in the vehicle height direction. When the eye point EP and the eye box EB are moved downward from the reference position EPa in the vehicle height direction, the virtual image S moves upward in the vehicle height direction, so that the luminance calculation unit 13b moves the extracted image region Pb upward in the vehicle height direction. In this way, the luminance calculation unit 13b moves and sets the extracted image region Pb based on the positions of the eye point EP and the eye box EB.

Figure 7:
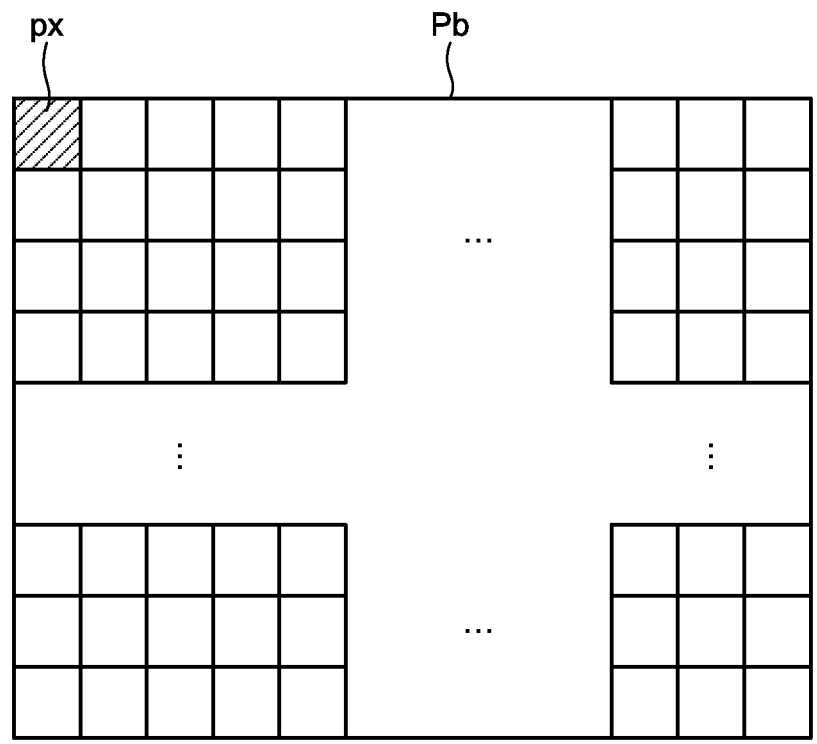
FIG. 7 is a diagram illustrating an example of a method of calculating luminance of the extracted image region according to the first embodiment.
Figure 8:
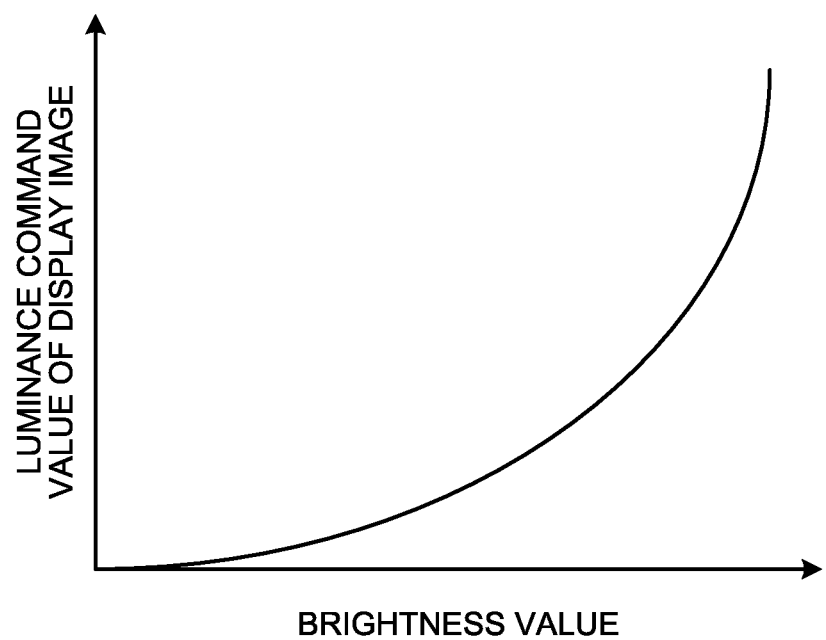
FIG. 8 is a diagram illustrating a setting example of luminance of a display image according to the first embodiment.

The luminance calculation unit 13b calculates luminance of the extracted image region Pb. For example, as illustrated in FIG. 7, the luminance calculation unit 13b acquires luminance of all pixels px in the extracted image region Pb, and calculates average luminance of the acquired luminance. The luminance calculation unit 13b obtains a luminance command value that sets luminance of the display image P based on the average luminance. The luminance command value is a value for changing the luminance of the display image P, and as the luminance command value is relatively higher, the luminance of the display image P becomes higher. The luminance calculation unit 13b has map data indicating a relationship between a brightness value (average luminance) and the luminance command value of the display image P illustrated in FIG. 8. As the average luminance of the extracted image region Pb increases, the luminance calculation unit 13b increases the luminance command value of the display image P. For example, the luminance calculation unit 13b exponentially increases the luminance command value of the display image P with respect to an increase in the average luminance of the extracted image region Pb. This is because a degree of increase in the luminance of the display image P should be increased in a case in which the extracted image region Pb is bright rather than a case in which the extracted image region Pb is dark to increase a difference between the average luminance of the extracted image region Pb and the luminance of the display image P. The luminance calculation unit 13b outputs, to the light controller 13c and the image generator 13d, the luminance command value of the display image P obtained based on the average luminance.

The light controller 13c adjusts an amount of light of the LED backlight 11b. The light controller 13c is connected to the luminance calculation unit 13b, and adjusts the amount of light of the LED backlight 11b based on the luminance command value of the display image P output from the luminance calculation unit 13b. For example, when the luminance command value of the display image P is high, the light controller 13c increases the amount of light of the LED backlight 11b. When the luminance command value of the display image P is low, the light controller 13c reduces the amount of light of the LED backlight 11b. Accordingly, the light controller 13c can adjust the luminance of the display image P displayed as a virtual image based on the luminance command value of the display image P.

The image generator 13d generates the display image P. The image generator 13d is connected to the liquid crystal display 11a, and outputs a signal for forming the display image P to the liquid crystal display 11a based on the luminance command value of the display image P. For example, when the luminance command value of the display image P is high, the image generator 13d causes the liquid crystal display 11a to display the display image P so that the luminance of the display image P is high. When the luminance command value of the display image P is low, the image generator 13d causes the liquid crystal display 11a to display the display image P so that the luminance of the display image P is low.

Figure 9:
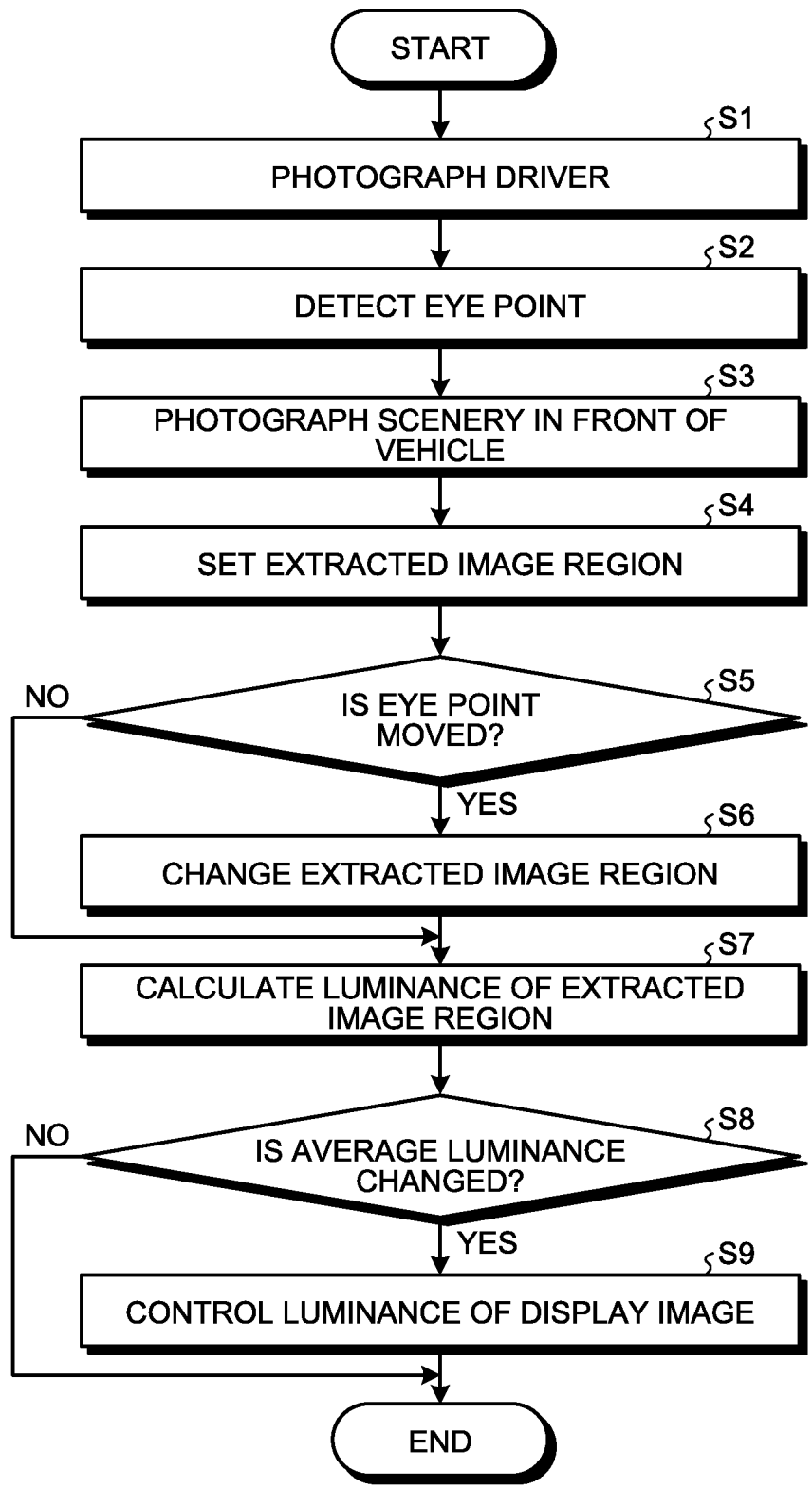
FIG. 9 is a flowchart illustrating an operation example of the vehicle display device according to the first embodiment.

Next, the following describes an operation example of the vehicle display device 1 with reference to FIG. 9. When an ignition of the vehicle 100 is turned ON, the vehicle display device 1 photographs the interior of the vehicle including the face of the driver D by the interior photographing camera 20 (Step S1). Next, the vehicle display device 1 detects the eye point EP of the driver D (Step S2). For example, the vehicle display device 1 detects the eye point EP of the driver D based on the position of the iris of the eyeball in the face image by the eye point detector 13a. Next, the vehicle display device 1 photographs the scenery in front of the vehicle 100 (Step S3). For example, the vehicle display device 1 photographs the scenery in front of the vehicle 100 from the outside of the eye box EB by the front photographing camera 30. Next, the vehicle display device 1 sets the extracted image region Pb (Step S4). For example, the vehicle display device 1 sets, as the extracted image region Pb, a region including a portion overlapping with the display image P (virtual image S) in the scenery photographing image PB by the luminance calculation unit 13b. Next, the vehicle display device 1 determines whether the eye point EP of the driver D is moved from a previous position (Step S5). When the eye point EP of the driver D is moved from the previous position (Yes in Step S5), the vehicle display device 1 changes the extracted image region Pb (Step S6). For example, when the eye point EP moves upward from the previous position in the vehicle height direction, the vehicle display device 1 moves the extracted image region Pb downward in the vehicle height direction. When the eye point EP moves downward from the previous position in the vehicle height direction, the vehicle display device 1 moves the extracted image region Pb upward in the vehicle height direction.

Next, the vehicle display device 1 calculates the luminance of the extracted image region Pb (Step S7). For example, the vehicle display device 1 acquires the luminance of all the pixels px in the extracted image region Pb, and calculates average luminance of the acquired luminance. Next, the vehicle display device 1 determines whether the average luminance of the extracted image region Pb is changed from previous average luminance (Step S8). If the average luminance of the extracted image region Pb is changed from the previous average luminance (Yes at Step S8), the vehicle display device 1 controls the luminance of the display image P (Step S9). For example, if the luminance of the extracted image region Pb is changed to be higher than the previous luminance, in the vehicle display device 1, the image generator 13d causes the liquid crystal display 11a to perform display so that the luminance of the display image P becomes higher than the previous luminance, and that the light controller 13c increases the amount of light of the LED backlight 11b as compared with the previous luminance. If the luminance of the extracted image region Pb is changed to be lower than the previous luminance, in the vehicle display device 1, the image generator 13d causes the liquid crystal display 11a to perform display so that the luminance of the display image P becomes lower than the previous luminance, and that the light controller 13c reduces the amount of light of the LED backlight 11b as compared with the previous luminance. In this way, the vehicle display device 1 controls the luminance of the display image P with respect to the luminance of the extracted image region Pb to adjust contrast of the display image P with respect to the scenery in front of the vehicle 100. The contrast means, for example, a difference in luminance between the darkest portion and the brightest portion of the image. After controlling the luminance of the display image P, the vehicle display device 1 projects the display light L including the display image P onto the front windshield 103, and ends the processing. During a period in which the ignition of the vehicle 100 is turned ON, the vehicle display device 1 repeatedly performs processing of adjusting the contrast of the display image P with respect to the scenery in front of the vehicle 100.

If the eye point EP of the driver D does not move from the previous position in Step S5 described above (No in Step S5), the vehicle display device 1 calculates the average luminance of the extracted image region Pb without changing the extracted image region Pb. If the average luminance of the extracted image region Pb is not changed from the previous average luminance in Step S8 described above (No in Step S8), the vehicle display device 1 projects the display light L including the display image P onto the front windshield 103 without changing the luminance of the display image P, and ends the processing.

As described above, the vehicle display device 1 according to the first embodiment adjusts the contrast of the display image P to the scenery in front of the vehicle 100 based on the image of the extracted image region Pb including a portion overlapping with the display image P (virtual image S) when viewed from the eye point EP in the scenery photographing image PB photographed by the front photographing camera 30 for photographing the scenery in front of the vehicle 100. Accordingly, for example, the vehicle display device 1 can increase the luminance of the display image P when the average luminance of the extracted image region Pb is high, and can reduce the luminance of the display image P when the average luminance of the extracted image region Pb is low. Thus, the vehicle display device 1 can appropriately set the contrast of the display image P to the scenery in front of the vehicle 100. Accordingly, the vehicle display device 1 can improve visibility of the display image P from the driver D.

The vehicle display device 1 photographs the scenery in front of the vehicle 100 by the front photographing camera 30 from the outside of the eye box EB as a region in which the display image P can be visually recognized. Accordingly, with the vehicle display device 1, the display image P is not included in the scenery photographing image PB obtained by photographing the scenery in front of the vehicle 100 by the front photographing camera 30. Thus, with the vehicle display device 1, the extracted image region Pb does not include the display image P, so that processing of removing the display image P can be omitted in calculating the average luminance of the extracted image region Pb as the scenery in front of the vehicle 100. Due to this, the vehicle display device 1 can easily calculate the average luminance of the extracted image region Pb.

In the vehicle display device 1, the extracted image region Pb is a region that is defined based on the eye point EP. Accordingly, the vehicle display device 1 can accurately set, as the extracted image region Pb, a background portion of the display image P (virtual image S) in the scenery photographing image PB. Thus, the vehicle display device 1 can further improve the visibility of the display image P (virtual image S) from the driver D.

Modification of First Embodiment

Figure 10:
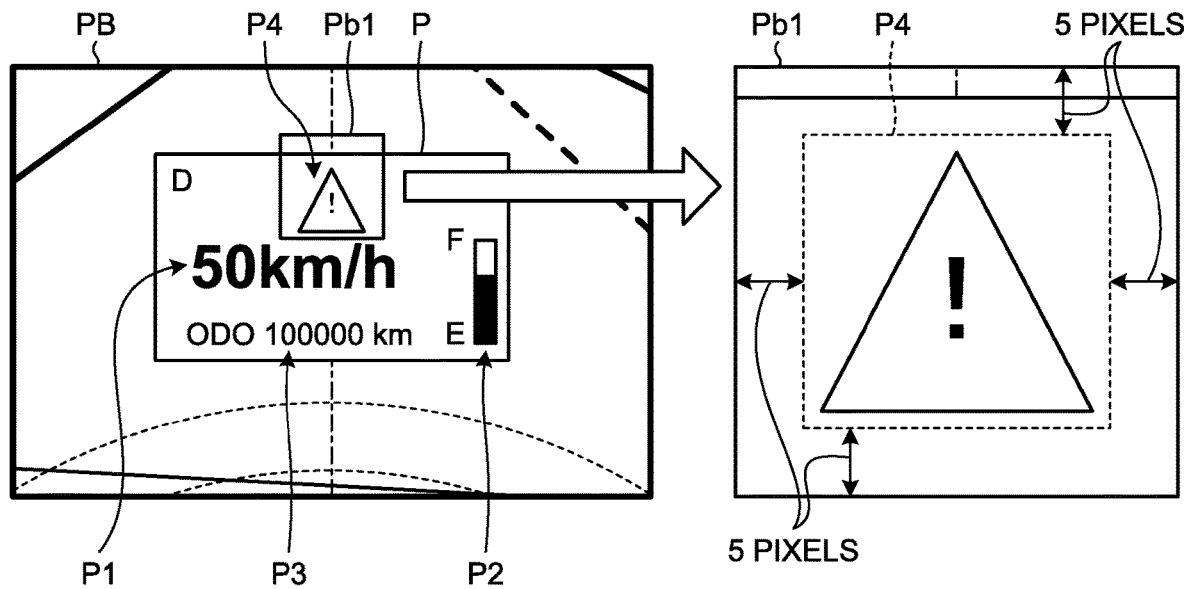
FIG. 10 is a diagram illustrating an extracted image region according to a modification of the first embodiment.

Next, the following describes a modification of the first embodiment. The first embodiment describes the example of setting the region corresponding to the space region of the eye box EB as the extracted image region Pb, but is not limited thereto. The vehicle display device 1 may set the extracted image region Pb based on a portion overlapping with part of the display image P (virtual image S) when viewed from the eye point EP in the scenery photographing image PB. For example, when the display image P includes a display item having high priority, the vehicle display device 1 sets the extracted image region Pb based on a portion overlapping with the display item having high priority when viewed from the eye point EP in the scenery photographing image PB. As illustrated in FIG. 10, for example, the display image P includes display items such as a vehicle speed P1, a residual amount P2 of fuel, a total mileage P3, and a warning mark (master caution display) P4, and the warning mark P4 is the display item having high priority. A position of the display item having high priority displayed in the display image P is determined in advance. When the warning mark P4 is displayed, the vehicle display device 1 sets an extracted image region Pb1 based on a portion overlapping with the warning mark P4 when viewed from the eye point EP. For example, the vehicle display device 1 sets, as the extracted image region Pb1, a region having a predetermined space, for example, a space corresponding to 5 pixels, in the width direction and the height direction of the warning mark P4. In this way, in the vehicle display device 1, when the display image P includes the display item having high priority, the extracted image region Pb1 is a region including the portion overlapping with the display item having high priority when viewed from the eye point EP in the scenery photographing image PB. Accordingly, the vehicle display device 1 can appropriately set contrast of the display item having high priority with respect to the scenery in front of the vehicle 100. Thus, the display device 1 for a vehicle can improve visibility of the display item having high priority from the driver D.

Figure 11:
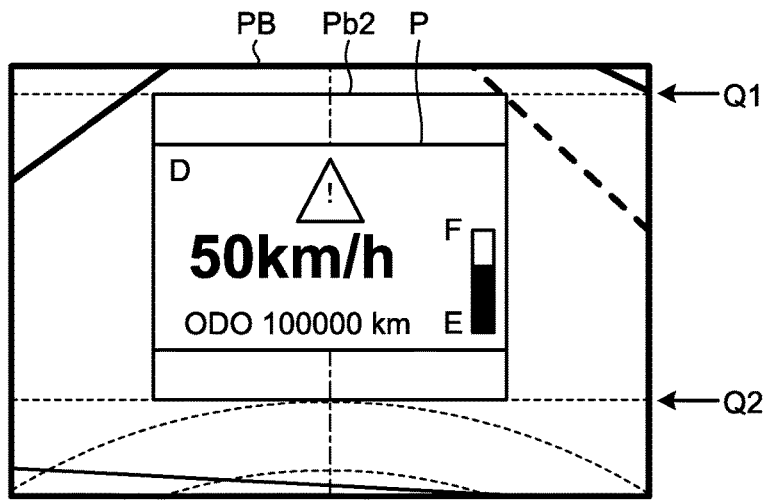
FIG. 11 is a diagram illustrating the extracted image region according to the modification of the first embodiment.

As illustrated in FIG. 11, the extracted image region Pb may be a largest region that is possibly overlapped with the display image P (virtual image S) when viewed from the eye point EP in the scenery photographing image PB. For example, the vehicle display device 1 sets, as the extracted image region Pb2, a region from an upper limit Q1 to which the display image P moves upward in the vehicle height direction to a lower limit Q2 to which the display image P moves downward in the vehicle height direction. Accordingly, the vehicle display device 1 can set the extracted image region Pb2 in advance, so that the extracted image region Pb2 can be easily set. Thus, the vehicle display device 1 can reduce an arithmetic amount, so that a processing speed can be increased.

Figure 12:
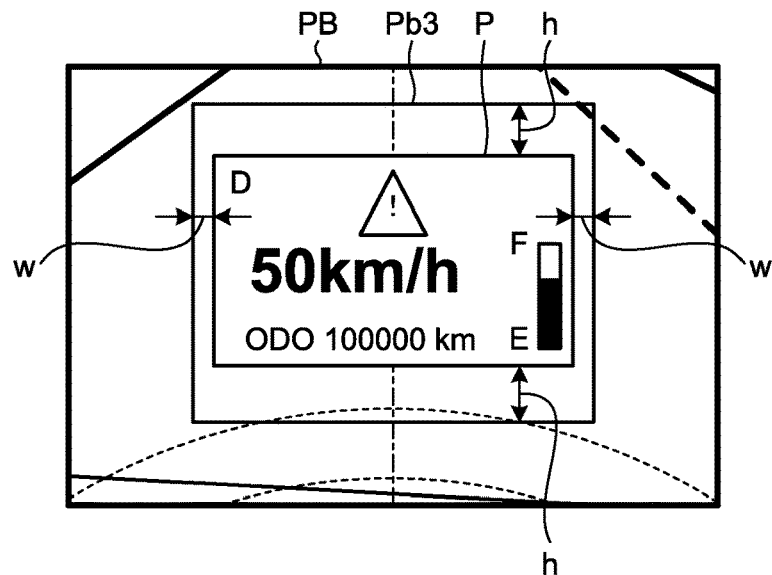
FIG. 12 is a diagram illustrating the extracted image region according to the modification of the first embodiment.

As illustrated in FIG. 12, the extracted image region Pb may be set based on the position of the display image P. For example, the vehicle display device 1 specifies the display image P (virtual image S) from the eye point EP in the scenery photographing image PB, and sets, as an extracted image region Pb3, a region including the specified display image P and having a range larger than a display size of the display image P. For example, the vehicle display device 1 sets, as the extracted image region Pb3, a region securing certain margins on an upper, a lower, the left, and the right sides of the display image P. In the vehicle display device 1, the upper and lower margins may be the same as or different from the left and right margins in the display image P. For example, the vehicle display device 1 sets, as the extracted image region Pb3, a rectangular region securing a margin h of 10 pixels on the upper and lower sides of the display image P, and securing a margin w of 5 pixels on the left and right sides of the display image P.

Figure 13:
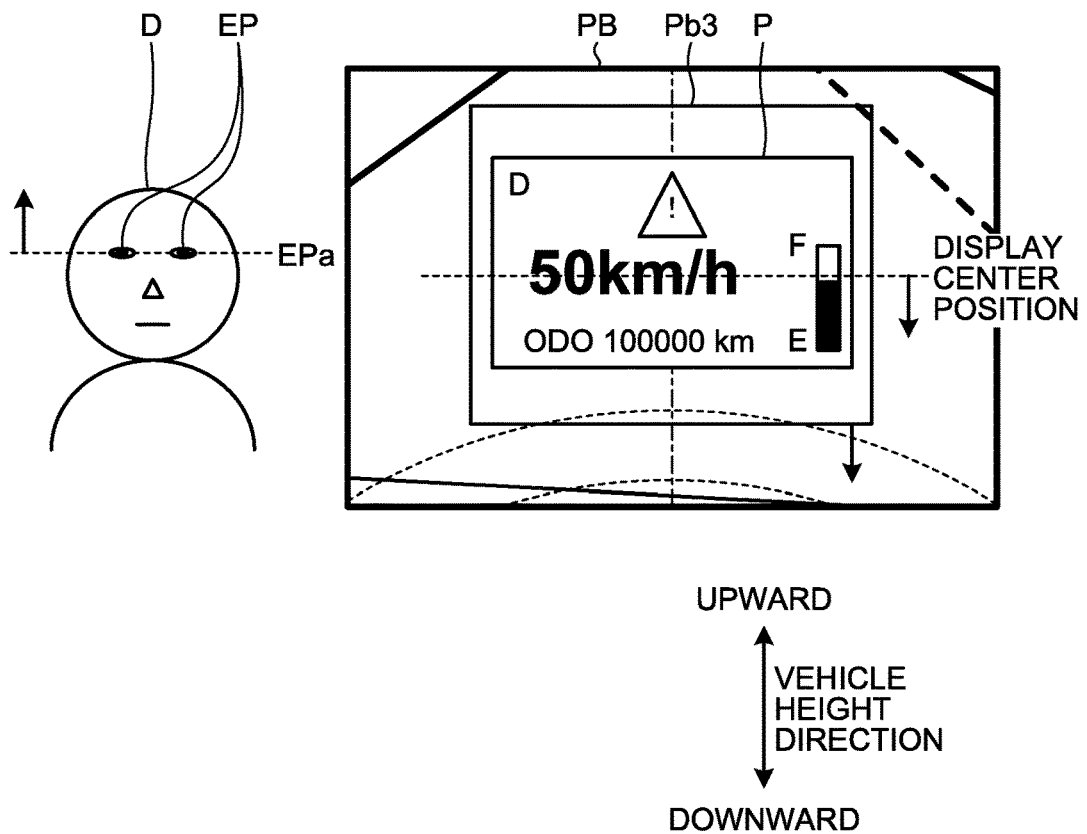
FIG. 13 is a diagram illustrating a movement example of the extracted image region according to the modification of the first embodiment.

The vehicle display device 1 moves the extracted image region Pb3 including the display image P (virtual image S) when viewed from the eye point EP in the vehicle height direction in accordance with movement of the eye point EP in the vehicle height direction. For example, in the vehicle display device 1, as illustrated in FIG. 13, when the eye point EP moves upward from the reference position EPa in the vehicle height direction, the display image P (virtual image S) moves downward in the vehicle height direction. Thus, the vehicle display device 1 moves the extracted image region Pb3 downward in the vehicle height direction corresponding to the display image P (virtual image S). In the vehicle display device 1, when the eye point EP moves downward in the vehicle height direction from the reference position EPa, the display image P (virtual image S) moves upward in the vehicle height direction. Thus, the vehicle display device 1 moves the extracted image region Pb3 upward in the vehicle height direction corresponding to the display image P (virtual image S). In this way, the vehicle display device 1 moves and sets the extracted image region Pb3 based on the position of the eye point EP.

Figure 14:
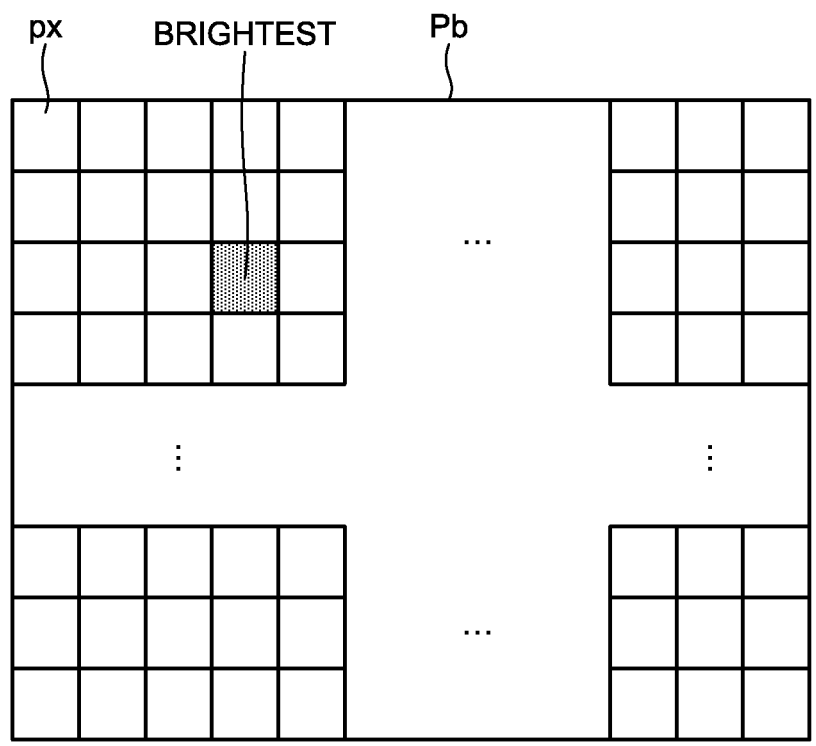
FIG. 14 is a diagram illustrating a method of calculating luminance of the extracted image region according to the modification of the first embodiment.

As illustrated in FIG. 14, the vehicle display device 1 may obtain the luminance command value for setting the luminance of the display image P based on the luminance of the brightest pixel px in the luminance of all the pixels px in the extracted image region Pb. In this case, the luminance calculation unit 13b has map data indicating a relationship between the brightness value (the luminance of the brightest pixel px) and the luminance command value of the display image P illustrated in FIG. 8.

Figure 15:
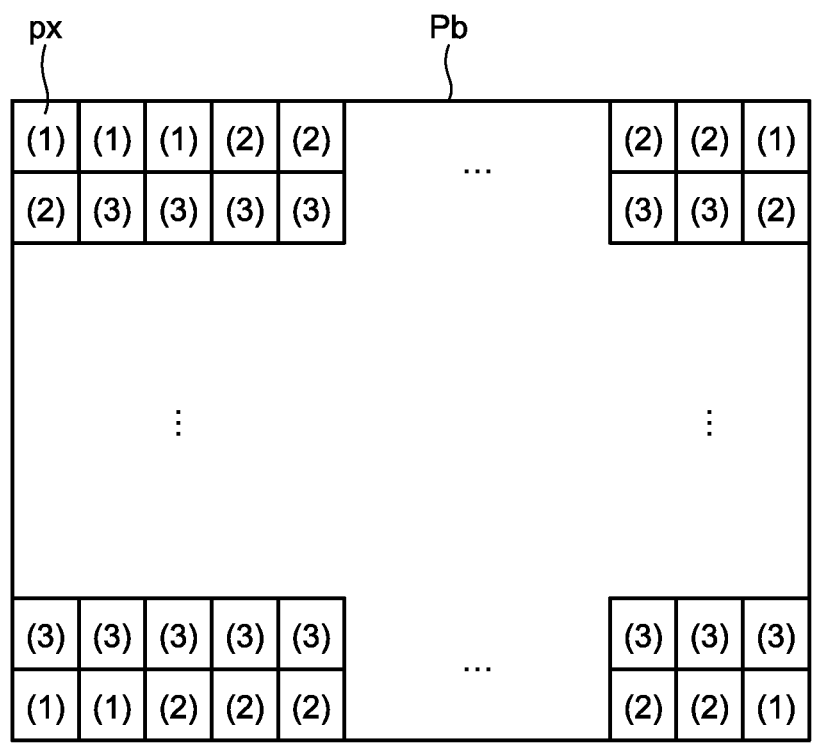
FIG. 15 is a diagram illustrating the method of calculating luminance of the extracted image region according to the modification of the first embodiment.

As illustrated in FIG. 15, the vehicle display device 1 may obtain the luminance command value for setting the luminance of the display image P based on the luminance of the pixel px that has appeared most frequently in the luminance of all the pixels px in the extracted image region Pb. In this case, the luminance calculation unit 13b has map data indicating a relation between the brightness value (the luminance of the pixel px that has appeared most frequently) and the luminance command value of the display image P illustrated in FIG. 8.

Figure 16:
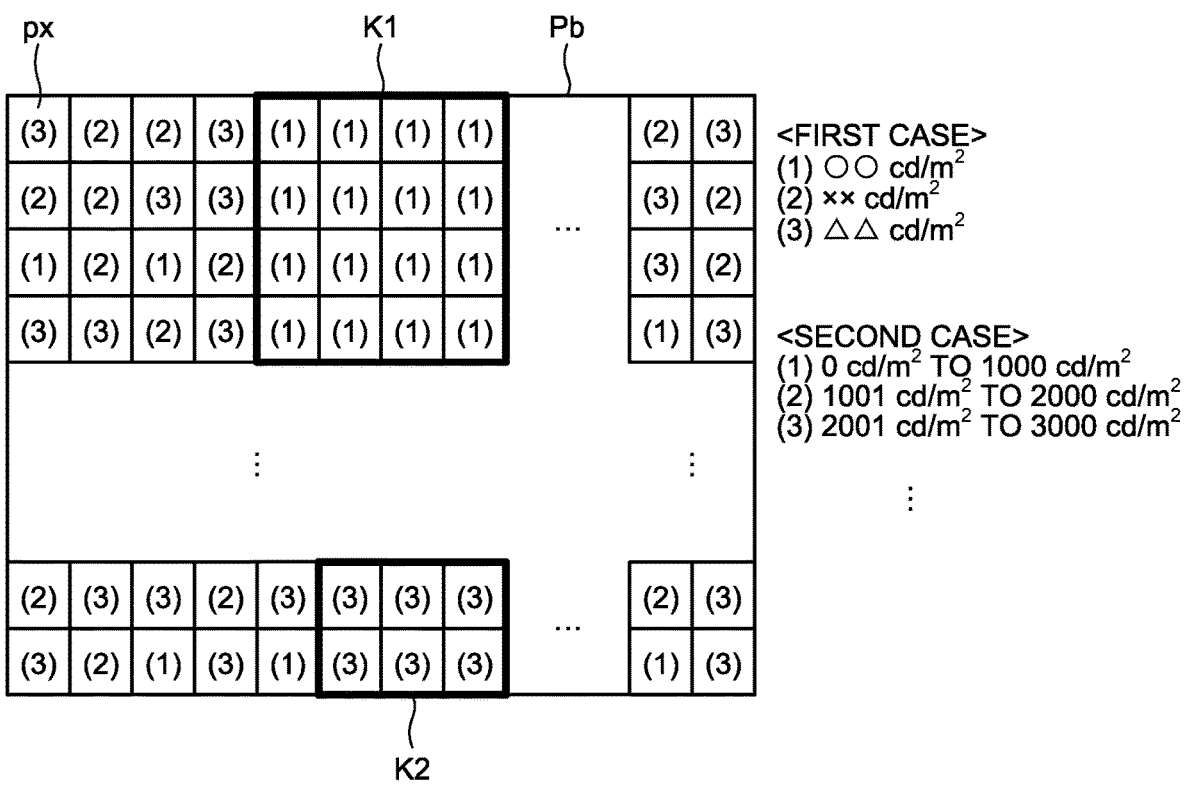
FIG. 16 is a diagram illustrating the method of calculating luminance of the extracted image region according to the modification of the first embodiment.

As illustrated in a first case of FIG. 16, the vehicle display device 1 detects a region constituted of continuous pixels px having the same luminance of all the pixels px in the extracted image region Pb. The vehicle display device 1 may obtain the luminance command value for setting the luminance of the display image P based on the luminance of the pixel px in the largest region in the detected region. In the example illustrated in FIG. 16, the vehicle display device 1 detects a region K1 and a region K2 in the extracted image region Pb, and obtains the luminance command value for setting the luminance of the display image P based on the luminance of the pixel px in the largest region K1 in the detected regions K1 and K2. The luminance calculation unit 13b has map data indicating a region between the brightness value (the luminance of the pixel px in the largest region) and the luminance command value of the display image P illustrated in FIG. 8. As illustrated in a second case of FIG. 16, the vehicle display device 1 detects a region constituted of continuous pixels px having luminance in a certain range among all the pixels px in the extracted image region Pb. The vehicle display device 1 may obtain the luminance command value for setting the luminance of the display image P based on the luminance of the pixels px in the largest region in the detected region. For example, the vehicle display device 1 obtains the luminance command value for setting the luminance of the display image P based on a median of the luminance of the pixel px in the largest region.

The front photographing camera 30 may photograph the scenery in front of the vehicle 100 from the inside of the eye box EB. In this case, the display image P is included in the scenery photographing image PB, so that the luminance calculation unit 13b sets the extracted image region Pb based on a portion excluding the display image P from the scenery photographing image PB. For example, the luminance calculation unit 13b performs pattern matching based on the display image P displayed as a virtual image to detect the display image P included in the scenery photographing image PB, and sets the extracted image region Pb based on a portion excluding the detected display image P.

The vehicle display device 1 may adjust the contrast of the display image P with respect to the scenery in front of the vehicle 100 by adjusting a hue (coloring) of the display image P. The vehicle display device 1 may adjust the contrast of the display image P with respect to the scenery in front of the vehicle 100 by adjusting saturation (vividness) of the display image P. The vehicle display device 1 may adjust the contrast of the display image P with respect to the scenery in front of the vehicle 100 by adjusting the brightness of the display image P. The vehicle display device 1 may adjust the contrast of the display image P with respect to the scenery in front of the vehicle 100 by appropriately combining the luminance, the hue, the saturation, and the brightness of the display image P.

The reflection member may be a combiner. The vehicle 100 may include a railway vehicle such as an electric train and a steam train in addition to an automobile.

Second Embodiment

Figure 17:
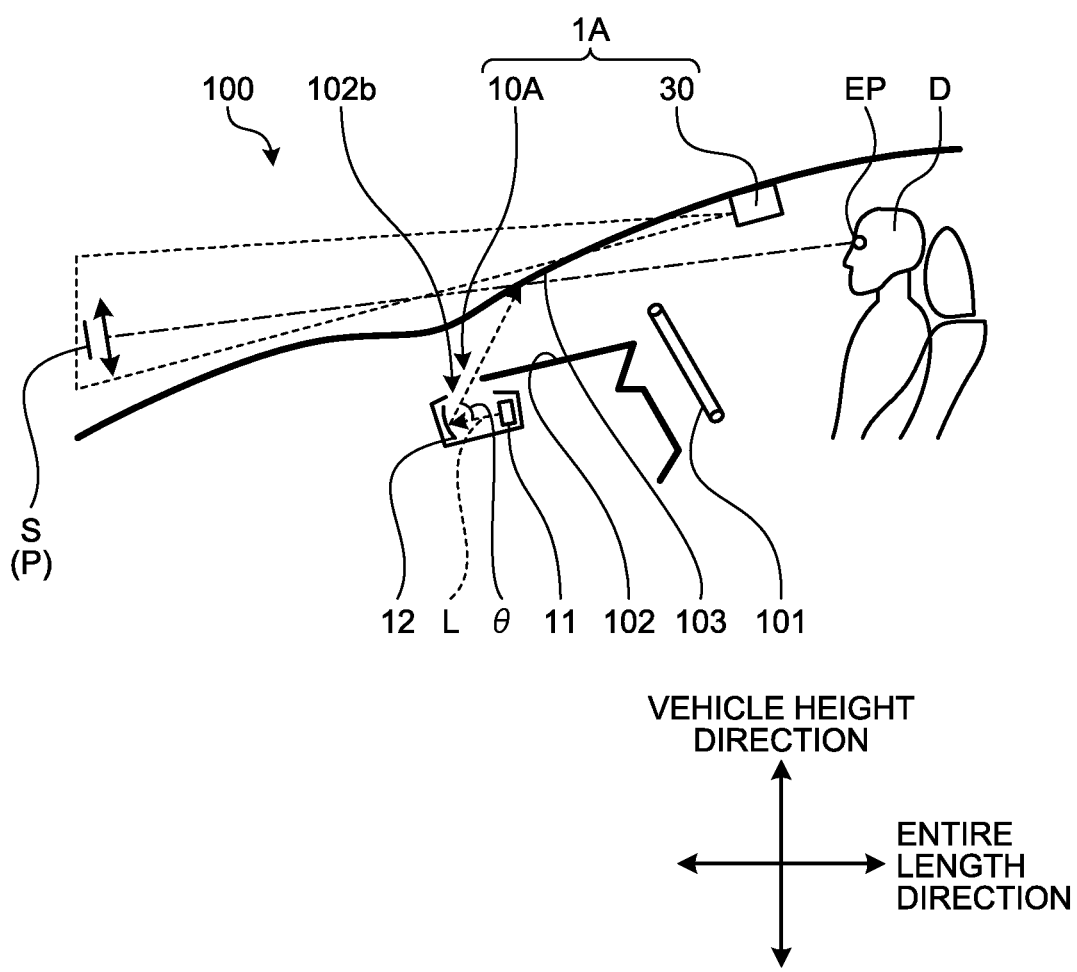
FIG. 17 is a schematic diagram illustrating a configuration example of a vehicle display device according to a second embodiment.
Figure 18:
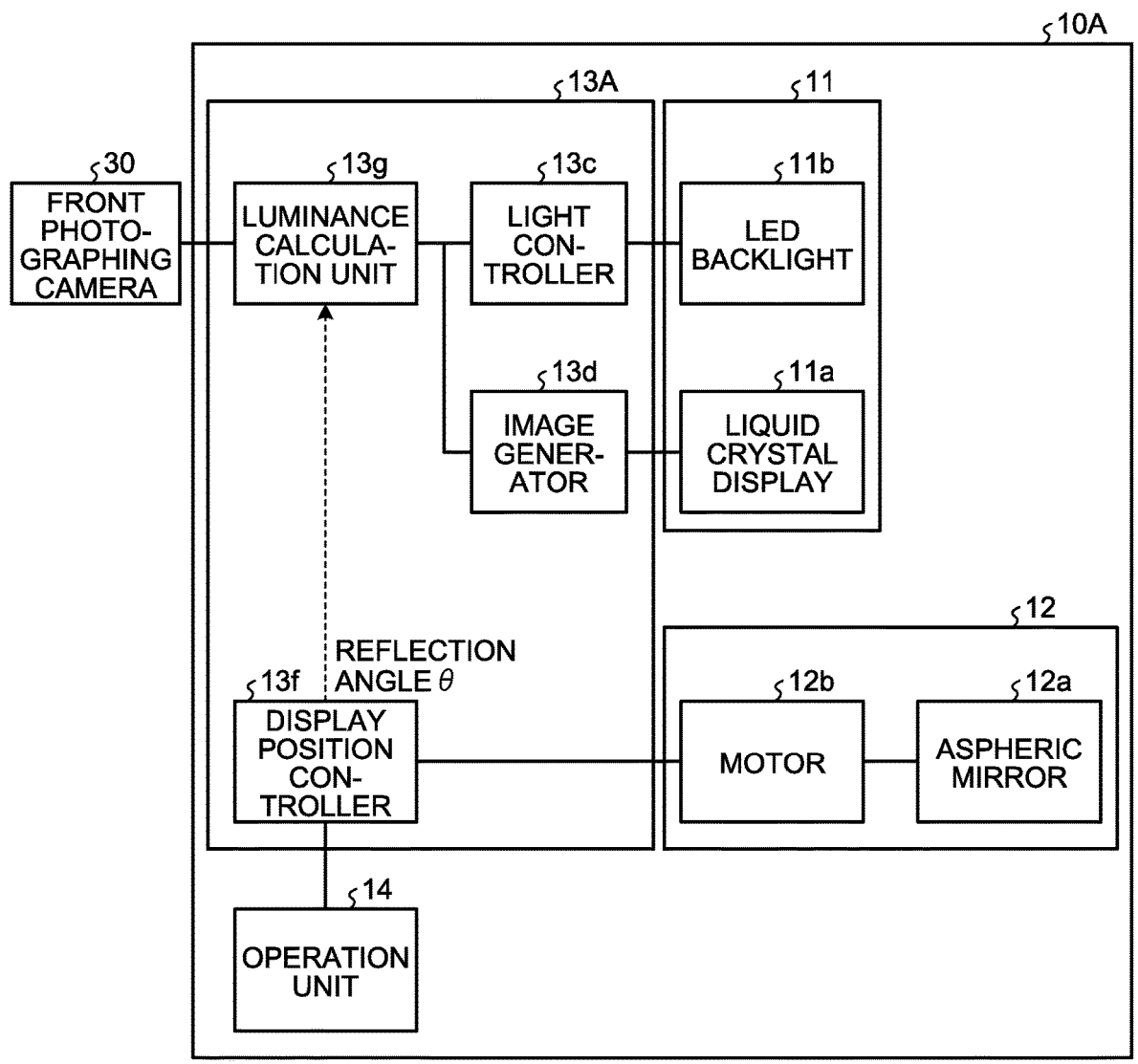
FIG. 18 is a block diagram illustrating a configuration example of the vehicle display device according to the second embodiment.

Next, the following describes a vehicle display device 1A according to a second embodiment. The vehicle display device 1A is different from the first embodiment in that the extracted image region Pb is set based on a reflection angle θ of the aspheric mirror 12a. In the second embodiment, the same component as that in the first embodiment is denoted by the same reference numeral, and detailed description thereof will not be repeated. As illustrated in FIGS. 17 and 18, the vehicle display device 1A according to the second embodiment includes an HUD device 10A and the front photographing camera 30. The vehicle display device 1A according to the second embodiment does not set the extracted image region Pb based on the eye point EP, so that the interior photographing camera 20 is not included therein.

The HUD device 10A includes the display device 11, the aspheric mirror unit 12, a controller 13A, and an operation unit 14. The controller 13A includes a display position controller 13f, a luminance calculation unit 13g, a light controller 13c, and an image generator 13d.

The operation unit 14 is used for specifying a display position of the display image P (virtual image S), and operated by the driver D. The operation unit 14 is connected to the display position controller 13f. The display position of the display image P in the vehicle height direction is designated by the driver D, and the operation unit 14 outputs an operation signal indicating the display position of the display image P to the display position controller 13f.

The display position controller 13f controls the display position of the display image P. The display position controller 13f is connected to the operation unit 14 and the aspheric mirror unit 12, and controls the aspheric mirror unit 12 based on the operation signal output from the operation unit 14. For example, the display position controller 13f supplies pulse power as a driving signal to the motor 12b of the aspheric mirror unit 12 to rotate the motor 12b with a predetermined step angle, and changes an angle of the aspheric mirror 12a with respect to the front windshield 103 to change the reflection angle θ of the display light L. The display position controller 13f is connected to the luminance calculation unit 13g, and outputs the reflection angle θ of the aspheric mirror 12a to the luminance calculation unit 13g. The display position controller 13f has, for example, map data in which the number of steps of the motor 12b is associated with the reflection angle θ of the aspheric mirror 12a in advance, and obtains the reflection angle θ of the aspheric mirror 12a based on the number of steps of the motor 12b.

Figure 19:
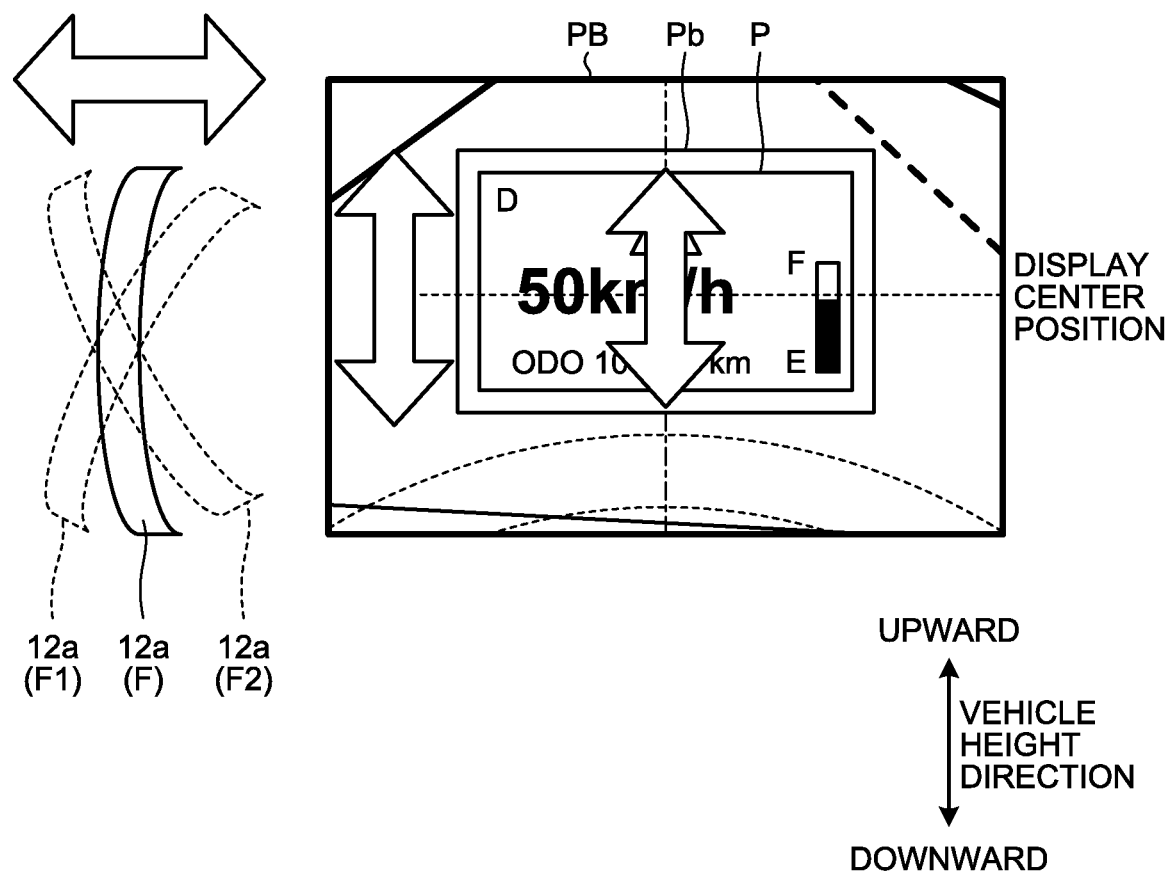
FIG. 19 is a diagram illustrating an example of an extracted image region according to the second embodiment.

The luminance calculation unit 13g calculates the luminance of the image. The luminance calculation unit 13g is connected to the front photographing camera 30, and sets, as the extracted image region Pb, a region including a portion overlapping with the display image P (virtual image S) when viewed from the eye point EP in the scenery photographing image PB photographed by the front photographing camera 30. For example, the luminance calculation unit 13g sets the extracted image region Pb based on the reflection angle θ of the aspheric mirror 12a. The luminance calculation unit 13g specifies the eye box EB based on the reflection angle θ of the aspheric mirror 12a, and sets, as the extracted image region Pb, a region corresponding to a space region of the eye box EB. The luminance calculation unit 13g sets, as the extracted image region Pb, a certain region including a portion that is possibly overlapped with the display image P (virtual image S) when viewed from the eye point EP in the scenery photographing image PB. For example, the luminance calculation unit 13g sets the extracted image region Pb to be large as the eye box EB is large, and sets the extracted image region Pb to be small as the eye box EB is small. The luminance calculation unit 13g moves the extracted image region Pb in the vehicle height direction to be set in accordance with the reflection angle θ of the aspheric mirror 12a. For example, as illustrated in FIG. 19, when the aspheric mirror 12a inclines from a neutral position F toward an inclined position F1 and the reflection angle θ is decreased, the display image P (virtual image S) moves upward in the vehicle height direction, so that the luminance calculation unit 13g moves the extracted image region Pb upward in the vehicle height direction. When the aspheric mirror 12a inclines from the neutral position F toward an inclined position F2 and the reflection angle θ is increased, the display image P (virtual image S) moves downward in the vehicle height direction, so that the luminance calculation unit 13g moves the extracted image region Pb downward in the vehicle height direction. In this way, the luminance calculation unit 13g moves and sets the extracted image region Pb based on the reflection angle θ of the aspheric mirror 12a corresponding to the inclination (angle) of the aspheric mirror 12a. The luminance calculation unit 13g may move and set the extracted image region Pb based on the number of steps of the motor 12b in place of the reflection angle θ of the aspheric mirror 12a.

Figure 20:
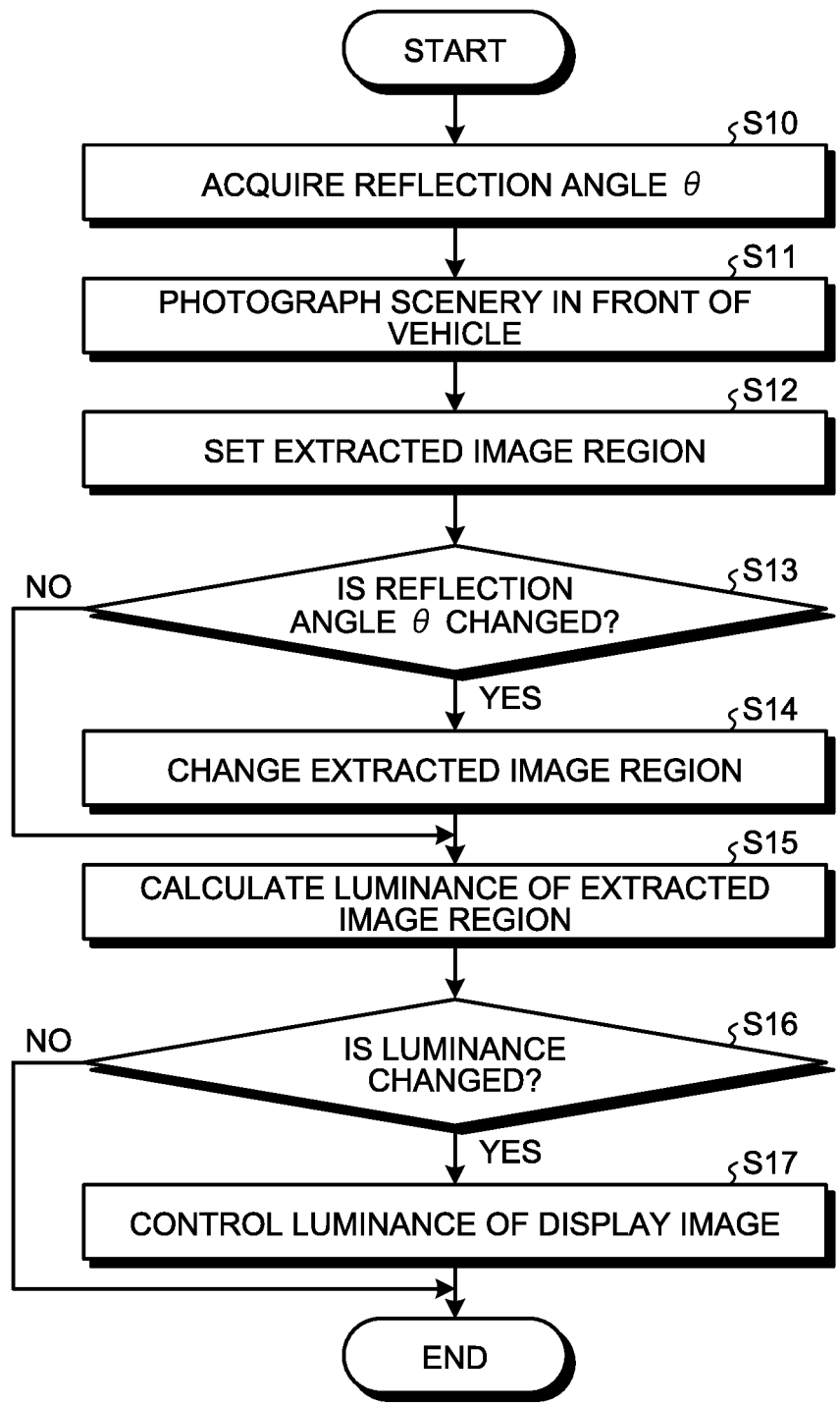
FIG. 20 is a flowchart illustrating an operation example of the vehicle display device according to the second embodiment.

Next, the following describes an operation example of the vehicle display device 1A with reference to FIG. 20. When the ignition of the vehicle 100 is turned ON, the vehicle display device 1A acquires the reflection angle θ of the aspheric mirror 12a (Step S10). Next, the vehicle display device 1A photographs the scenery in front of the vehicle 100 (Step S11). For example, the vehicle display device 1A photographs the scenery in front of the vehicle 100 from the outside of the eye box EB by the front photographing camera 30. Next, the vehicle display device 1A sets the extracted image region Pb (Step S12). For example, the vehicle display device 1A sets, as the extracted image region Pb, a region including a portion overlapping with the display image P (virtual image S) in the scenery photographing image PB by the luminance calculation unit 13g. Next, the vehicle display device 1A determines whether the reflection angle θ of the aspheric mirror 12a is changed from the previous reflection angle θ (Step S13). If the reflection angle θ of the aspheric mirror 12a is changed from the previous reflection angle θ (Yes in Step S13), the vehicle display device 1A changes the extracted image region Pb (Step S14). For example, the vehicle display device 1A moves the extracted image region Pb upward in the vehicle height direction when the reflection angle θ of the aspheric mirror 12a is decreased, and moves the extracted image region Pb downward in the vehicle height direction when the reflection angle θ of the aspheric mirror 12a is increased.

Next, the vehicle display device 1A calculates the luminance of the extracted image region Pb (Step S15). For example, the vehicle display device 1A acquires the luminance of all the pixels px in the extracted image region Pb, and calculates average luminance of the acquired luminance. Next, the vehicle display device 1A determines whether the average luminance of the extracted image region Pb is changed from the previous average luminance (Step S16). If the average luminance of the extracted image region Pb is changed from the previous average luminance (Yes in Step S16), the vehicle display device 1A controls the luminance of the display image P (Step S17). For example, when the average luminance of the extracted image region Pb is changed to be higher than the previous average luminance, in the vehicle display device 1A, the image generator 13d causes the liquid crystal display 11a to display such that the luminance of the display image P becomes higher than the previous luminance, or the light controller 13c increases the amount of light of the LED backlight 11b as compared with the previous luminance. When the average luminance of the extracted image region Pb is changed to be lower than the previous average luminance, in the vehicle display device 1A, the image generator 13d causes the liquid crystal display 11a to display such that the luminance of the display image P becomes lower than the previous luminance, or the light controller 13c reduces the amount of light of the LED backlight 11b as compared with the previous luminance. In this way, the vehicle display device 1A controls the luminance of the display image P with respect to the average luminance of the extracted image region Pb to adjust the contrast of the display image P with respect to the scenery in front of the vehicle 100. After controlling the luminance of the display image P, the vehicle display device 1A projects the display light L including the display image P onto the front windshield 103, and ends the processing. During a period in which the ignition of the vehicle 100 is turned ON, the vehicle display device 1A repeatedly performs processing of adjusting the contrast of the display image P to the scenery in front of the vehicle 100.

If the reflection angle θ of the aspheric mirror 12a is not changed from the previous reflection angle θ in Step S13 described above (No in Step S13), the vehicle display device 1A calculates the average luminance of the extracted image region Pb without changing the extracted image region Pb. If the average luminance of the extracted image region Pb is not changed from the previous average luminance in Step S16 described above (No in Step S16), the vehicle display device 1A projects the display light L including the display image P onto the front windshield 103 without changing the luminance of the display image P, and ends the processing.

As described above, with the vehicle display device 1A according to the second embodiment, the extracted image region Pb is determined based on the reflection angle θ of the aspheric mirror 12a. Accordingly, the vehicle display device 1A has the same effect as that in the first embodiment, and can set the extracted image region Pb without detecting the eye point EP based on the interior photographing image PA photographed by the interior photographing camera 20. Thus, the vehicle display device 1A can improve visibility of the display image P from the driver D with a simple configuration and processing.

The vehicle display device according to each of the present embodiments can improve visibility of the display image by the driver by adjusting contrast of the display image with respect to the scenery in front of the vehicle based on the image of the extracted image region including a portion overlapping with the display image when viewed from the eye point in the photographing image photographed by the photographing unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:
a display unit that projects a display image onto a reflection member arranged in front of a driver's seat of a vehicle, and overlaps the display image with scenery in front of the vehicle to display the display image as a virtual image; and
a photographing unit that is installed in the vehicle and photographs at least the scenery in front of the vehicle, wherein
the display unit adjusts contrast of the display image to the scenery in front of the vehicle based on an image of an extracted image region including a portion overlapping with the display image when viewed from an eye point in a photographing image photographed by the photographing unit, the eye point corresponding to a position of an eye of a driver on the driver's seat,
when the display image includes a display item of high priority and a display item of low priority that display different items of information from each other, the extracted image region includes a portion where the display item of high priority overlaps and does not include a portion where the display item of low priority overlaps, when viewed from the eye point such that the display unit sets contrast of the extracted image region that includes the portion where the display item of high priority overlaps to be different from the portion of the display image where the display item of low priority overlaps.

2. The vehicle display device according to claim 1, wherein
the photographing unit photographs the scenery in front of the vehicle from an outside of an eye box as a region in which the display image can be visually recognized.

3. The vehicle display device according to claim 2, further comprising:
a detector that detects the eye point, wherein
the extracted image region is a region that is determined based on the eye point detected by the detector.

4. The vehicle display device according to claim 2, wherein
the display unit includes
a projector that projects the display image, and
a mirror that reflects the display image projected by the projector to the reflection member, and
the extracted image region is a region that is determined based on a reflection angle of the mirror.

5. The vehicle display device according to claim 4, wherein
when the display image includes a display item having high priority, the extracted image region is a region including a portion overlapping with the display item having high priority when viewed from the eye point in the photographing image.

6. The vehicle display device according to claim 2, wherein
the extracted image region is a largest region that is possibly overlapped with the display image when viewed from the eye point in the photographing image.

7. The vehicle display device according to claim 1, further comprising:
a detector that detects the eye point, wherein
the extracted image region is a region that is determined based on the eye point detected by the detector.

8. The vehicle display device according to claim 1, wherein
the display unit includes
a projector that projects the display image, and
a mirror that reflects the display image projected by the projector to the reflection member, and
the extracted image region is a region that is determined based on a reflection angle of the mirror.

9. The vehicle display device according to claim 8, wherein
when the display image includes a display item having high priority, the extracted image region is a region including a portion overlapping with the display item having high priority when viewed from the eye point in the photographing image.

10. The vehicle display device according to claim 1, wherein
the extracted image region is a largest region that is possibly overlapped with the display image when viewed from the eye point in the photographing image.

11. The vehicle display device according to claim 1, wherein
the display unit adjusts the contrast of the display image which includes the display item of high priority and the display item of low priority based on the image of the extracted image region.

* * * * *